United States Patent
Yamada (10) Patent No.: US 10,126,989 B2
(45) Date of Patent: Nov. 13, 2018

(54) PRINTING APPARATUS, CONTROL METHOD OF PRINTING APPARATUS, AND STORAGE MEDIUM

(71) Applicant: CANON KABUSHIKI KAISHA, Tokyo (JP)

(72) Inventor: Tetsuya Yamada, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/707,718

(22) Filed: Sep. 18, 2017

(65) Prior Publication Data
US 2018/0081599 A1  Mar. 22, 2018

(30) Foreign Application Priority Data
Sep. 21, 2016 (JP) ................ 2016-184464

(51) Int. Cl.
  *G06F 3/12* (2006.01)
  *G06F 21/60* (2013.01)
  *G06F 21/31* (2013.01)

(52) U.S. Cl.
  CPC ............ *G06F 3/1205* (2013.01); *G06F 3/126* (2013.01); *G06F 21/604* (2013.01); *G06F 21/608* (2013.01); *G06F 3/1239* (2013.01); *G06F 3/1259* (2013.01); *G06F 3/1285* (2013.01); *G06F 21/31* (2013.01)

(58) Field of Classification Search
  CPC ...... G06F 3/1205; G06F 3/126; G06F 3/1239; G06F 3/1285; G06F 3/1259; G06F 21/31
  See application file for complete search history.

(56) References Cited

U.S. PATENT DOCUMENTS

| 7,315,824 | B2* | 1/2008 | Chen | G06Q 10/02 705/5 |
| 8,223,376 | B2* | 7/2012 | Shudo | G06F 21/608 358/1.15 |
| 2006/0001897 | A1* | 1/2006 | Ogasawara | H04N 1/32128 358/1.13 |
| 2012/0260350 | A1* | 10/2012 | Yamada | H04N 1/00411 726/28 |
| 2013/0222827 | A1* | 8/2013 | Watanabe | G06F 3/122 358/1.13 |

(Continued)

FOREIGN PATENT DOCUMENTS

JP  2007-251279 A  9/2007

*Primary Examiner* — Dung D Tran
(74) *Attorney, Agent, or Firm* — Canon U.S.A., Inc. IP Division (57) ABSTRACT

An image forming apparatus with a plurality of functions including at least a print function includes a print data management unit that stores print data received from a plurality of information processing apparatuses, a login control unit that performs use control on a user-by-user basis, and a user interface control unit that displays a user interface screen on a display unit, where the login control unit causes, in a case where a guest user not required to be authenticated to log into the image forming apparatus is permitted to log into the image forming apparatus, the user interface control unit to display a user interface screen for selecting a function to be used from among the plurality of functions, where the print function is selectable via the user interface screen in units of the plurality of information processing apparatuses.

7 Claims, 11 Drawing Sheets

(56) References Cited

U.S. PATENT DOCUMENTS

| | | | | |
|---|---|---|---|---|
| 2014/0211240 A1* | 7/2014 | Maki | ................. | G06F 3/1222 |
| | | | | 358/1.14 |
| 2014/0233053 A1* | 8/2014 | Kakutani | ............ | G06F 3/1222 |
| | | | | 358/1.14 |
| 2014/0337445 A1* | 11/2014 | Nishida | ................ | H04L 51/28 |
| | | | | 709/206 |
| 2016/0085979 A1* | 3/2016 | Fukasawa | ......... | H04N 1/00151 |
| | | | | 726/17 |
| 2016/0171355 A1* | 6/2016 | Maki | ................. | G06F 3/1222 |
| | | | | 358/1.13 |

* cited by examiner

| UID | DOMAIN | PASSWORD | DISPLAY NAME | CARD ID | ROLE | GROUP |
|---|---|---|---|---|---|---|
| honda | staff | *** | HONDA | 1512345 | ADMINISTRATOR | SALES |
| okazaki | staff | *** | OKAZAKI | 8543333 | EMPLOYEE | ACCOUNTING |
| kagawa | staff | *** | KAGAWA | 2344326 | EMPLOYEE | GENERAL AFFAIRS |
| guest | pc1 | | PRINT FROM GUEST PC1 | | GUEST | GUEST |
| guest | pc2 | | PRINT FROM GUEST PC2 | | GUEST | GUEST |
| guest | | | COPY | | GUEST | GUEST |

FIG.5

| ROLE | COPY | PRINT | TRANSMISSION | SETTING/REGISTRATION |
|---|---|---|---|---|
| ADMINISTRATOR | YES | YES | YES | YES |
| EMPLOYEE | YES | YES | YES | NO |
| GUEST | YES | YES | NO | NO |

| PRINT DATA NAME | INPUT SOURCE NAME | NUMBER OF PAGES | NUMBER OF COPIES | TIME OF INPUT |
|---|---|---|---|---|
| CONTRACT.docx | staff¥honda | 4 | 1 | 2016/5/5 9:00 AM |
| REPORT.pptx | staff¥okazaki | 10 | 8 | 2016/5/5 10:00 AM |
| TOKYO GOURMET.xlsx | pc1¥guest | 2 | 1 | 2016/5/5 1:00 PM |
| MAP.html | pc2¥guest | 1 | 1 | 2016/5/5 2:00 PM |
| ESTIMATE.docx | staff¥honda | 5 | 1 | 2016/5/5 3:00 PM |

FIG.8

| DOCUMENT NAME | NUMBER OF PAGES | NUMBER OF COPIES | TIME |
|---|---|---|---|
| ☐ TOKYO GOURMET.xlsx | 2 | 1 | 13:00 |
| ☐ | | | |

PRINT

PRINT FROM GUEST PC1

START PRINTING

PRINTING APPARATUS, CONTROL METHOD OF PRINTING APPARATUS, AND STORAGE MEDIUM

BACKGROUND

Field of the Invention

The present disclosure relates to a control method in hold printing.

Description of the Related Art

Hold printing for holding print data transmitted from a personal computer (PC) in a memory of a server or printer, listing information about the held print data on a user interface (UI) screen of the printer, and outputting the print data according to a user's selection and print instruction is now implemented. Concerning the display of the print data in such hold printing, Japanese Patent Application Laid-Open No. 2007-251279 discusses a technique for limiting information about print data to be listed on a UI screen of a printer including a user authentication function to information corresponding to a user logged in to the printer.

As a use case of the foregoing hold printing, there is an operation form in which workers in an office where a printer is installed can use the printer on a user authentication basis while business travelers use the printer as guests without user authentication. As another operation form, in libraries and schools, staff members can use a printer on a user authentication basis while visitors pay to use the printer. In these operation forms of hold printing, a plurality of guest users (unauthenticated users) can transmit print data from respective different PCs. In such a case, according to Japanese Patent Application Laid-Open No. 2007-251279, which is based on user authentication, the print data from each PC is unable to be displayed on the UI screen of the printer.

SUMMARY OF THE INVENTION

The present invention is directed to enabling display of print data input from each PC in a situation in which a plurality of PCs is used for hold printing.

According to an aspect of the present disclosure, an image forming apparatus with a plurality of functions including at least a print function includes a print data management unit configured to store print data received from a plurality of information processing apparatuses, a login control unit configured to perform use control on a user-by-user basis, and a user interface control unit configured to display a user interface screen on a display unit, wherein the login control unit is configured to, in a case where a guest user not required to be authenticated to log into the image forming apparatus is permitted to log into the image forming apparatus, cause the user interface control unit to display a user interface screen for selecting a function to be used from among the plurality of functions, wherein the print function is selectable via the user interface screen in units of the plurality of information processing apparatuses.

Further features will become apparent from the following description of exemplary embodiments with reference to the attached drawings.

DESCRIPTION OF THE EMBODIMENTS

Exemplary embodiments will be described below with reference to the drawings. The following exemplary embodiments are not intended to be limiting. All combinations of features described in the exemplary embodiments are not necessarily indispensable. In the following description, similar configurations are designated by the same reference numerals.

A first exemplary embodiment will be described by using a hold printing system expecting two types of users as an example. The two types of users include an authenticated user who uses an image forming apparatus after user authentication and a guest user (unauthenticated user) who uses the image forming apparatus as a guest without user authentication and pays a fee each time.

<System Configuration>

Figure 1:
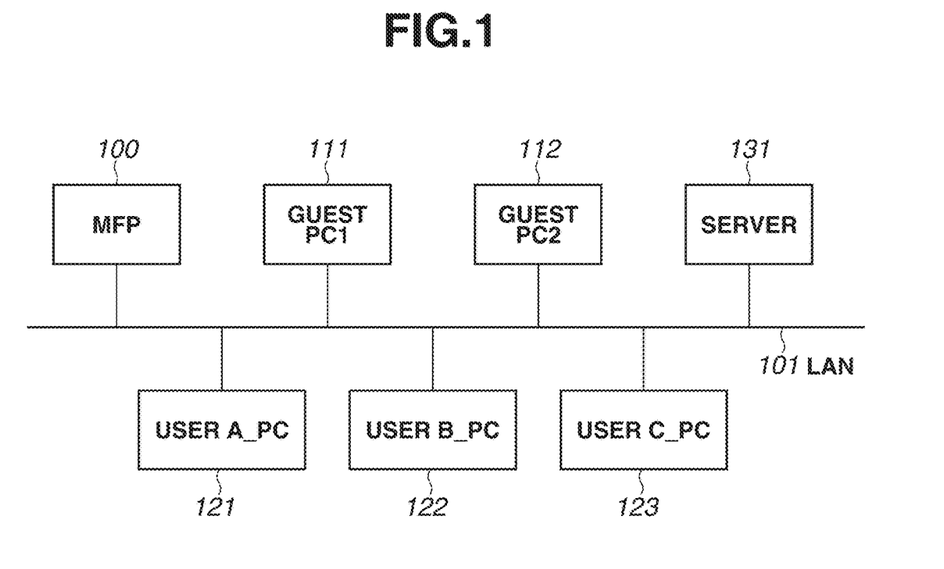
FIG. 1 is a diagram illustrating an example of a configuration of a hold printing system.

FIG. 1 is a diagram illustrating an example of a configuration of a hold printing system according to the present exemplary embodiment. In the hold printing system according to the present exemplary embodiment, two guest PCs 111 and 112, three PCs 121 to 123 associated with specific users, and a server 131 are connected to a multifunction peripheral (MFP) 100 via a local area network (LAN) 101. The MFP 100 is a multi function printer with a plurality of functions including copy, print, and mail transmission functions. A user A_PC 121, a user B_PC 122, and a user C_PC 123 are PCs owned and used by users A, B, and C, respectively, who are authenticated users. The guest PC1 (111) and guest PC2 (112) are PCs used by guests who are unauthenticated users. Print data (print job) of documents that the users want to print are transmitted to the MFP 100 via the PCs (information processing apparatuses) serving as user terminals. The server 131 is an information processing apparatus that manages common resources and provide functions required for the hold printing system.

<Hardware Configuration of MFP>

Figure 2:
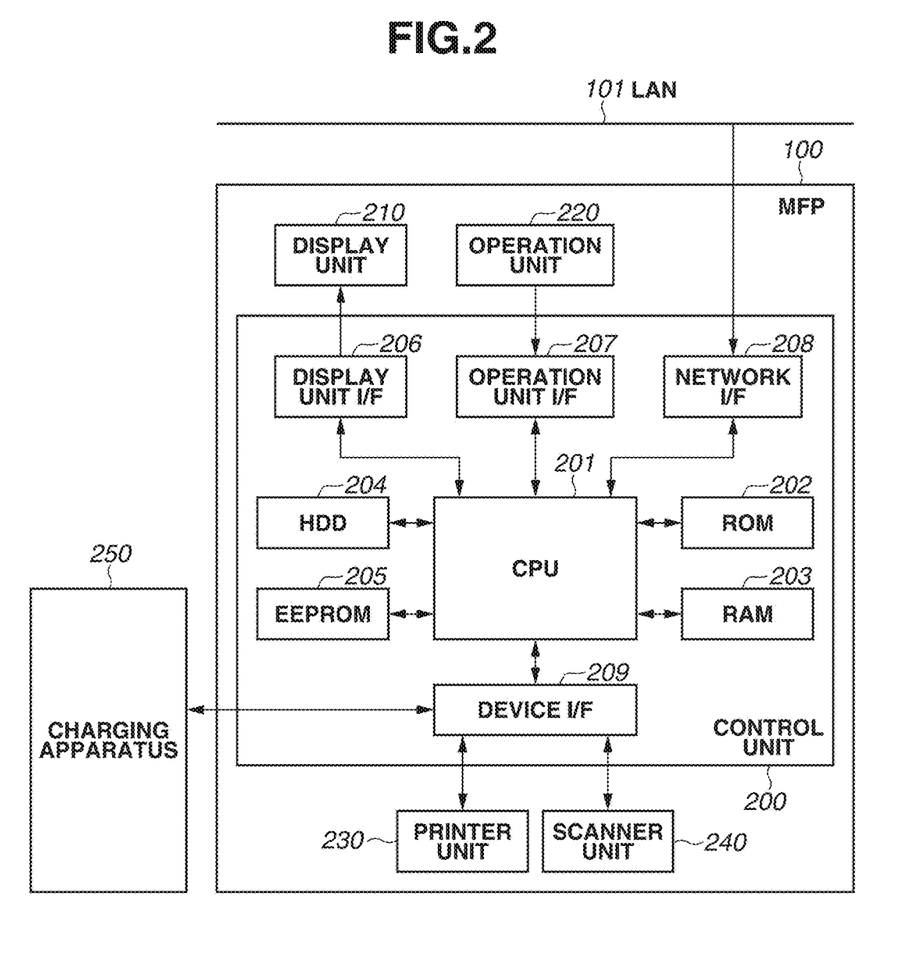
FIG. 2 is a block diagram illustrating a hardware configuration of a multifunction peripheral (MFP).

FIG. 2 is a block diagram illustrating a hardware configuration of the MFP 100. The MFP 100 includes a control unit 200, a display unit 210, an operation unit 220, a printer unit 230, and a scanner unit 240.

The display unit 210 includes a light-emitting diode (LED) and a liquid crystal display, and displays UI screens, described below, and various types of information including an internal state of the MFP 100. The operation unit 220 includes various buttons and accepts operations from a user.

If the operation unit 220 includes a touch panel in addition to a plurality of buttons, the operation unit 220 also includes a function as the display unit 210.

The printer unit 230 forms an image related to print data on a sheet and outputs the resultant according to a print instruction from the control unit 200. The printer unit 230 is connected with the control unit 200 via a device interface (I/F) 209. The scanner unit 240 performs a scan operation of optically reading a document set on a not-illustrated document table to obtain image data according to a scan instruction from the control unit 200. The obtained image data (scan data) is transmitted to the control unit 200. The scanner unit 240 is connected with the control unit 200 via the device I/F 209.

The control unit 200 includes a central processing unit (CPU) 201, a read-only memory (ROM) 202, a random access memory (RAM) 203, a hard disk drive (HDD) 204, an electrically erasable programmable ROM (EEPROM) 205, a display unit I/F 206, an operation unit I/F 207, a network I/F 208, and the device I/F 209. The CPU 201 is an arithmetic processing unit that executes various control programs to control operation of various units. The ROM 202 stores a boot program for system activation. The RAM 203 is a volatile memory. The CPU 201 uses the RAM 203 as a work memory when executing the control programs. The HDD 204 is a mass storage device, and stores print data and scan data aside from the control programs. The EEPROM 205 is a nonvolatile memory, and stores setting values required in executing the control programs. Information required for user authentication, such as identification (ID) and a password, is stored in the EEPROM 205.

The device I/F 209 is an I/F for controlling input and output of data between the control unit 200 and the connected devices (the printer unit 230, the scanner unit 240, and a charging apparatus 250). The device I/F 209 can be implemented as a bus structure to which a plurality of devices can be connected, as well as be divided into a plurality of I/Fs and connected with the devices on a one-on-one basis. The display unit I/F 206 is an I/F for controlling information output to the display unit 210. The operation unit I/F 207 is an I/F for receiving information input from the operation unit 220. The network I/F 208 is an I/F for receiving print data input from the PCs on the LAN 101.

The charging apparatus 250 performs charging processing when the guest user uses the MFP 100 to use a print function and a copying function. The MFP 100 communicates with the charging apparatus 250 via the device I/F 209 and performs processing for withdrawing a required amount of money from a deposit that the guest user puts in the charging apparatus 250.

<Software Configuration of MFP>

Figure 3:
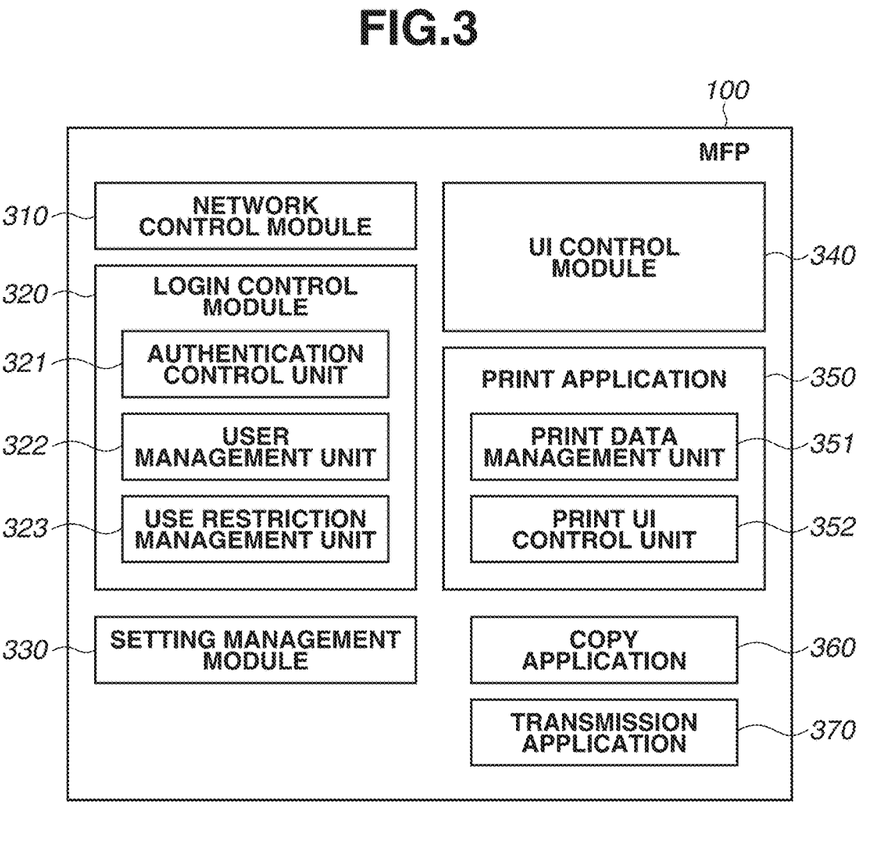
FIG. 3 is a block diagram illustrating a software configuration of the MFP.

FIG. 3 is a block diagram illustrating a software configuration of the MFP 100. The software of the MFP 100 includes a network control module 310, a login control module 320, a setting management module 330, a UI control module 340, a print application 350, a copy application 360, and a transmission application 370. The login control module 320 includes an authentication control unit 321, a user management unit 322, and a use restriction management unit 323. The print application 350 includes a print data management unit 351 and a print UI control unit 352.

The network control module 310 performs data transmission and reception control by using the network I/F 208. The network control module 310 receives print data transmitted from the PCs, and passes the print data to the print data management unit 351 in the print application 350.

The UI control module 340 performs display control on the display unit 210 to display UI screens for a user using the MFP 100 to make various inputs and provide instructions. The UI screens include a role selection screen that is displayed immediately after the MFP 100 is activated, an authentication screen for prompting an authenticated user to perform an authentication action, and a function menu screen for a logged in user to select a function that the logged in user is going to use.

The login control module 320 performs processing for performing use control of the MFP 100 user by user, and information management required for the processing. As described above, the login control module 320 includes the authentication control unit 321, the user management unit 322, and the use restriction management unit 323.

Figure 4:
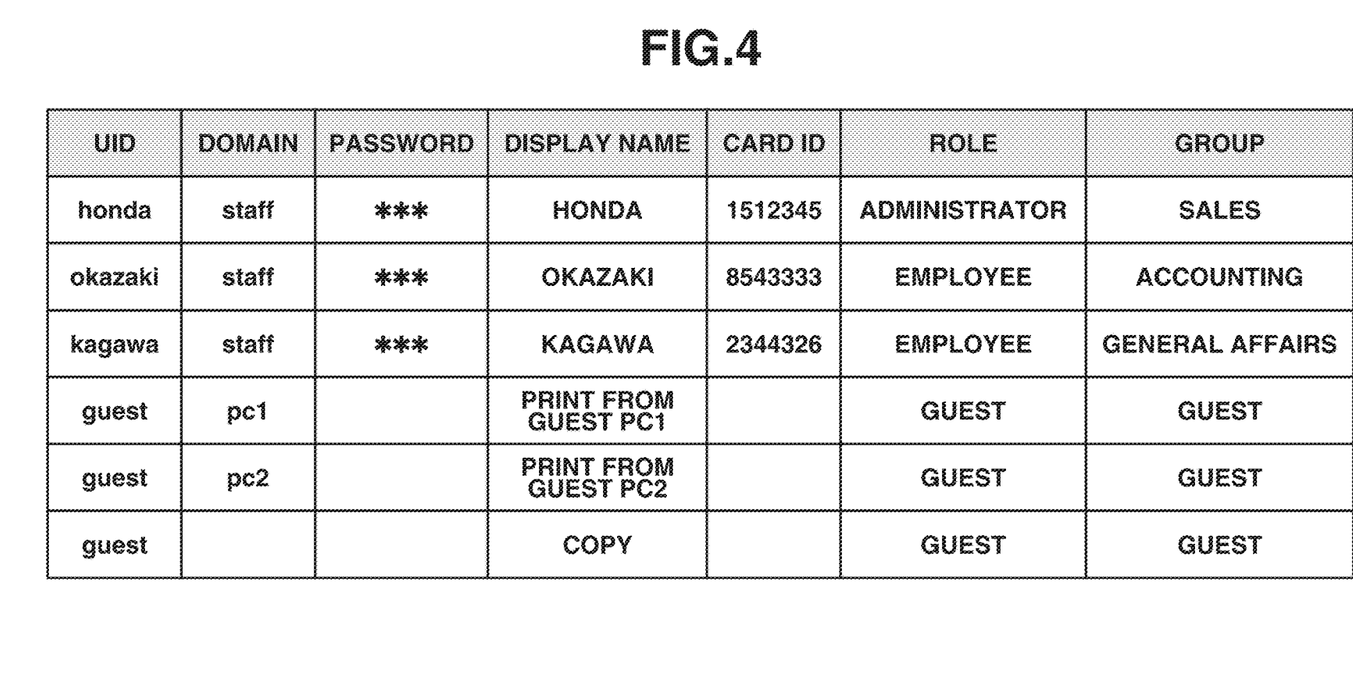
FIG. 4 illustrates an example of a user management table.

The authentication control unit 321 controls entire processing concerning authentication when a user logs in. The user management unit 322 registers and manages users who can use the MFP 100. FIG. 4 illustrates an example of a user management table. A user who uses the MFP 100 is uniquely identified by a combination of user ID information "uid" indicating the name of each user and domain information "domain" for identifying each PC on the network. For example, in the case of an authenticated user, the user ID information "uid" is a name identifying the user (for example, "honda"), and the domain information "domain" is "staff" indicating a non-guest PC. In the case of a guest user, the user ID information "uid" is "guest" indicating a guest, and the domain information "domain" is a symbol indicating a guest PC ("pc1" corresponding to the guest PC1 or "pc2" corresponding to the guest PC2). Based on the domain information "domain", each of the plurality of PCs provided for guests can be identified.

Information "password" indicates a character string used by the authenticated user during login authentication. Information "display name" is used in displaying a username on UI screens corresponding to the respective functions. Identification information "card ID" is stored in an integrated circuit (IC) card when an IC card is used to perform login authentication. Information "role" indicates user attributes in units of which the use restriction management unit 323 performs use restriction.

In the present exemplary embodiment, the user attributes include three types of attributes "administrator", "employee", and "guest". Information "group" also indicates user attributes. The information "group" is used for identification in performing control in unit of departments to which the users belong, e.g., "sales", "accounting", "general affairs", and "guest". If a guest user uses the copy function, unlike when using the print function, user identification does not need to be performed. The guest user is therefore registered as a guest with "null" in the domain information "domain" and "guest" in the user ID information "uid".

Figure 5:
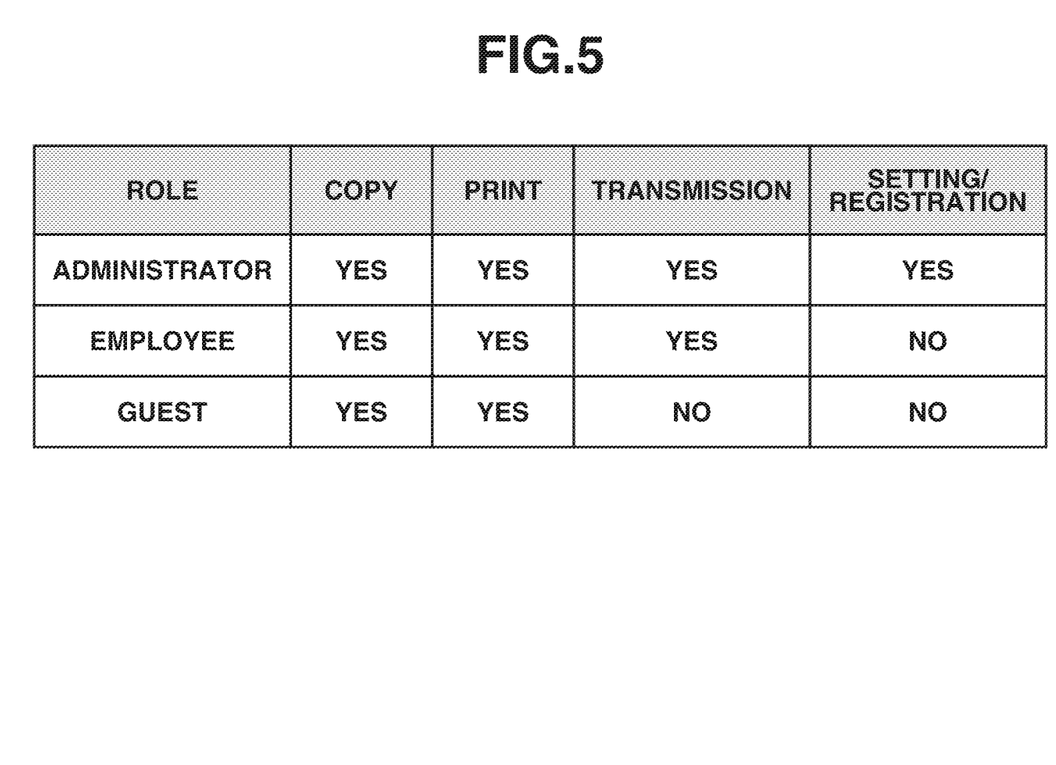
FIG. 5 illustrates an example of a use restriction management table.
Figure 6A:
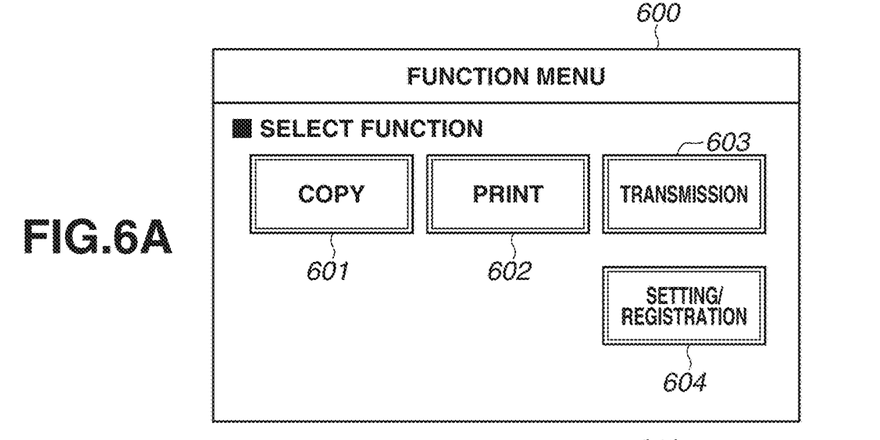
FIGS. 6A to 6C are diagrams each illustrating an example of a function menu screen.
Figure 6B:
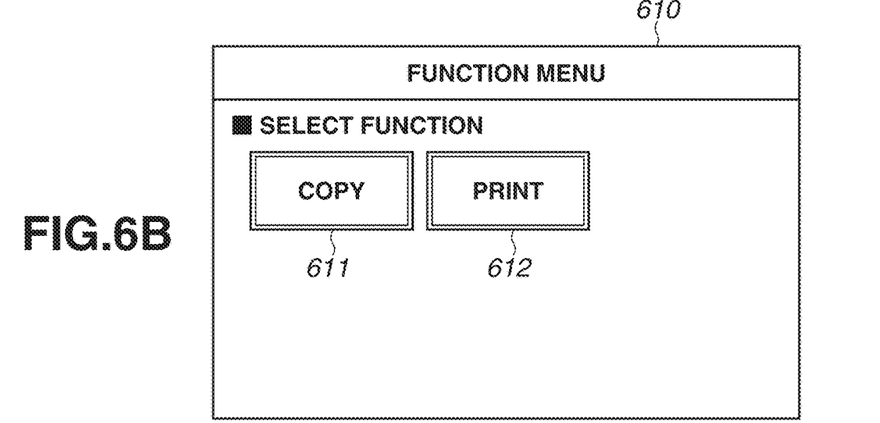
Figure 6C:
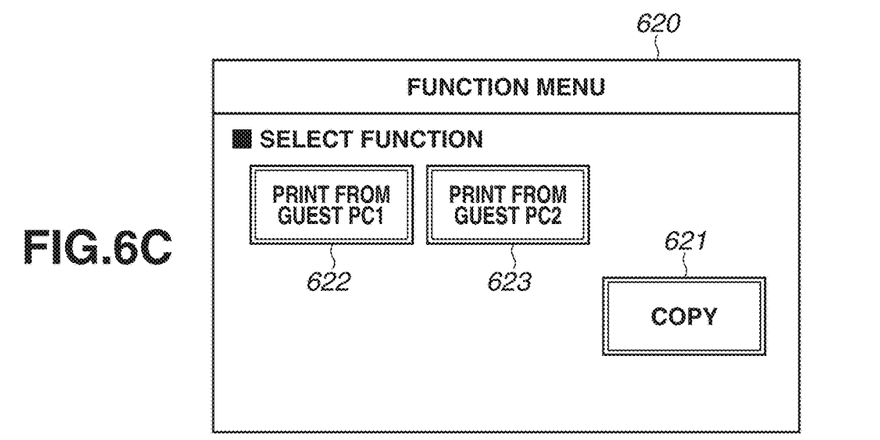

The use restriction management unit 323 controls and manages which level of user can use which function among the plurality of functions of the MFP 100. FIG. 5 illustrates an example of a use restriction management table. The use restriction management table illustrated in FIG. 5 manages the availability of the functions in units of "role" attributes in the foregoing user management table. FIGS. 6A, 6B, and 6C are diagrams illustrating examples of menu screens (function menu screens) that display functions available to a user. The menu screens are generated according the use restriction management table.

FIG. 6A illustrates a function menu screen displayed when a user having a "role" attribute of "administrator" logs in. FIG. 6B illustrates a function menu screen displayed when a user having a "role" attribute of "guest" logs in. A function menu screen 600 for an authenticated user includes buttons 601 to 604 corresponding to the copy function, the print function, the transmission function, and a setting/registration function, respectively. The user presses a button corresponding to a desired function among the functions, and uses the function.

According to the setting of the use restriction management table illustrated in FIG. 5, function menu screens 610 and 620 for a guest user are configured such that no button corresponding to the transmission function or the setting/registration function is provided to prevent such functions from being selectable. The function menu screen 620 of FIG. 6C displays as many buttons about the print function as the number of PCs that guest users can use (here, two buttons 622 and 623). That is, the function menu screen 620 is configured as a UI screen in which the print function can be selected in units of the plurality of information processing apparatuses (user terminals).

The function menu screen 620 of FIG. 6C displays the "display name" of users who can use the function as a guest on the buttons 622 and 623. For example, users who can use the function as a guest (and guest PCs) are identified in the following manner:

If the user ID information "uid" has a specific value (or a specific prefix), or in the present exemplary embodiment, if the user ID information "uid" is "guest", the user is a guest user.

If the information "role" or "group" indicating a user attribute has a specific value, or in the present exemplary embodiment, if the information "role" or "group" is "guest", the user is a guest user.

If the domain information "domain" does not have a specific value that means a non-guest (in the present exemplary embodiment, "staff"), the user is a guest user. If the domain information "domain" is "pc1", the guest PC is the guest PC1. If the domain information "domain" is "pc2", the guest PC is the guest PC2.

The user management unit 322 and the use restriction management unit 323 can be included in the server 131, and the MFP 100 can be configured to make an inquiry during login authentication.

The print application 350, the copy application 360, and the transmission application 370 are applications for implementing respective functions that the MFP 100 can provide for users. The print application 350 is an application for printing and outputting print data (print job) input from each PC by using the printer unit 230. The copy application 360 is an application for printing and outputting image data obtained by the scanner unit 240 scanning a document using the printer unit 230. The transmission application 370 is an application for externally transmitting image data obtained by the scanner unit 240 scanning a document by mail or by facsimile (FAX).

Figure 7:
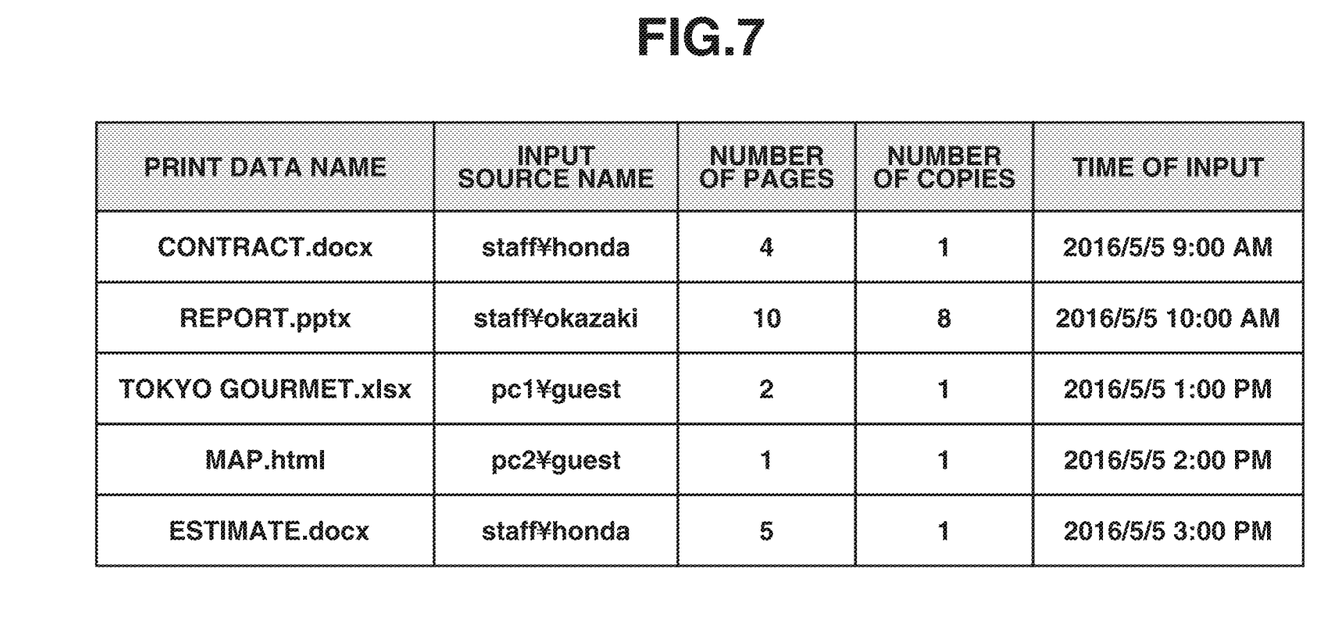
FIG. 7 illustrates an example of a print data management table.

The print application 350 includes the print data management unit 351 and the print UI control unit 352. The print data management unit 351 stores and manages detailed information about print data received by the network control module 310 in the HDD 204 based on input source information provided to the print data. FIG. 7 illustrates an example of a table (print data management table) for managing detailed information about print data. A field "print data name" of the print data management table stores a filename of print data input from each PC. A field "input source name" stores information for identifying the user inputting the print data.

More specifically, information obtained by connecting the contents of the foregoing domain information "domain" and user ID information "uid" with "\" is stored in the field "input source name". For example, in the case of an authenticated user registered in advance, information such as "staff\honda" is stored. In the case of a guest user, information such as "pc1\guest" is stored. A field "number of pages" stores a value indicating the number of pages of the input print data. A field "number of copies" stores a value indicating the number of copies of the input print data. A field "time of input" stores time information about the time when the print data is input. If print data is received from a PC of an unregistered guest user, the PC of the unregistered guest user may be automatically registered in the user management table.

The print UI control unit 352 compares the user ID information "uid" and the domain information "domain" about the login user with "input source name" in the print data management table illustrated in FIG. 7. The print UI control unit 352 then lists information about print data of which the information and "input source name" coincide on the display unit 210 via the UI control module 340. The user selects a desired piece of print data from the list and gives a print instruction.

Figure 8:
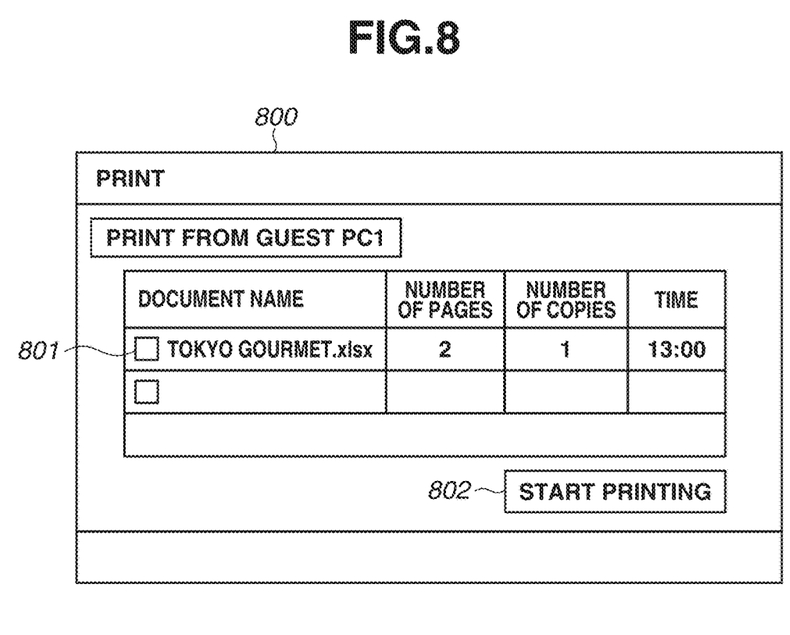
FIG. 8 is a diagram illustrating an example of a print user interface (UI) screen.

FIG. 8 illustrates an example of a print UI screen provided by the print UI control unit 352. FIG. 8 illustrates a print UI screen 800 displayed when a user as a guest inputs print data from the guest PC1. If the user checks a checkbox 801 of the document name to be printed in the list and presses a print start button 802, print processing of the print data is started. In the present exemplary embodiment, "pc1" is assigned to the domain information "domain" about the guest PC1, and "pc2" is assigned to the domain information "domain" about the guest PC2. In addition, "guest" is assigned to the user ID information "uid" about a guest user. Both the user ID information "uid" and the domain information "domain" are combined to manage guest users inputting print data by using different PCs to be different users (see the user management table of FIG. 4). With such registration and management, if the guest user inputting print data by using the guest PC1 logs in, the print UI control unit 352 can list only print data with an input source name of "pc1\guest" on the print UI screen 800 (see FIGS. 7 and 8). The foregoing comparison can be performed by just using the domain information "domain" without the user ID information "uid".

The setting management module 330 manages various setting values about the MFP 100 in an integrated manner, and provides a UI in changing the setting values.

<Processing During Login>

Figure 9:
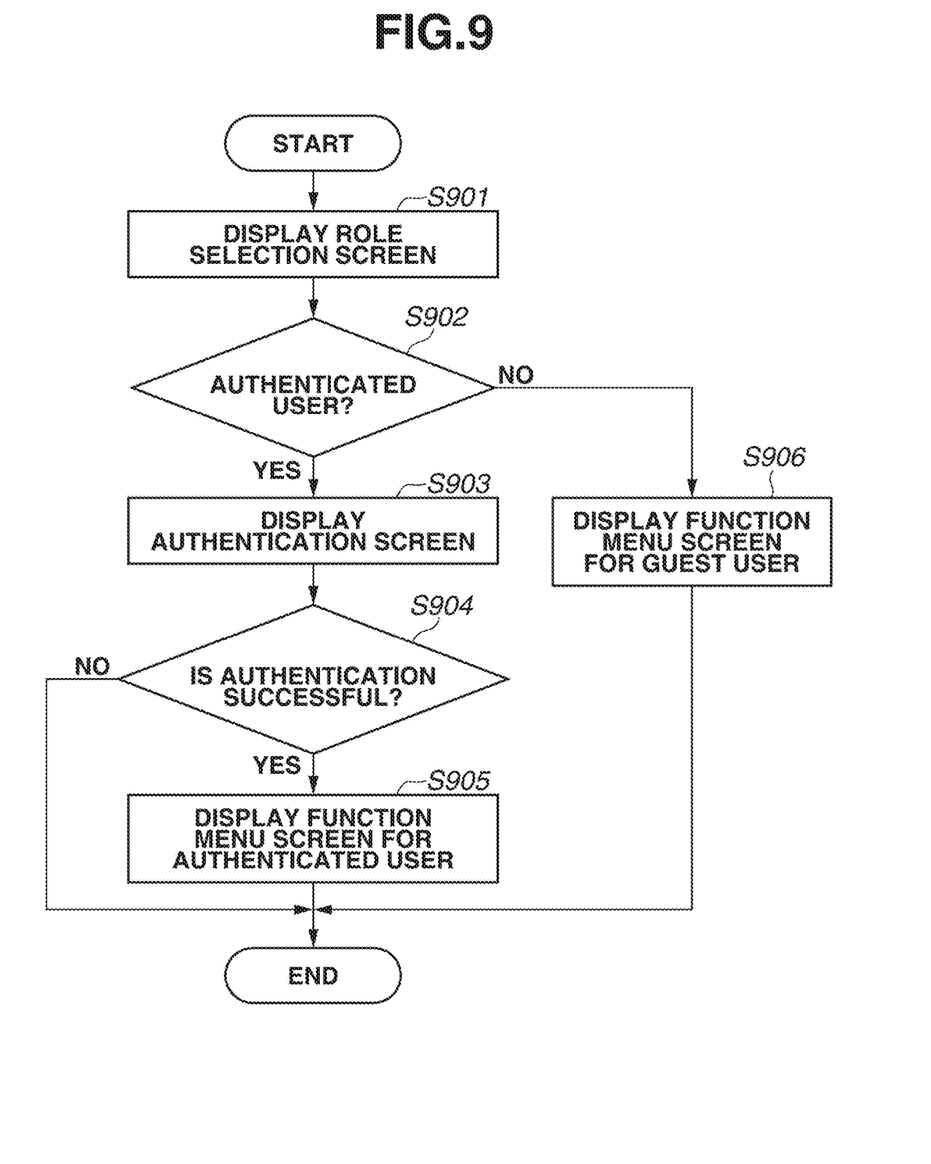
FIG. 9 is a flowchart illustrating a flow of processing during login according to a first exemplary embodiment.

Next, processing when a user logs in to the MFP 100 according to the present exemplary embodiment will be described. The processing during login is implemented by the authentication control unit 321 in the login control module 320. More specifically, the CPU 201 reads the program of the authentication control unit 321 from the HDD 204, loads the program into the RAM 203, and executes the program to implement the processing. FIG. 9 is a flowchart illustrating a flow of the processing during login according to the present exemplary embodiment.

Figure 10A:
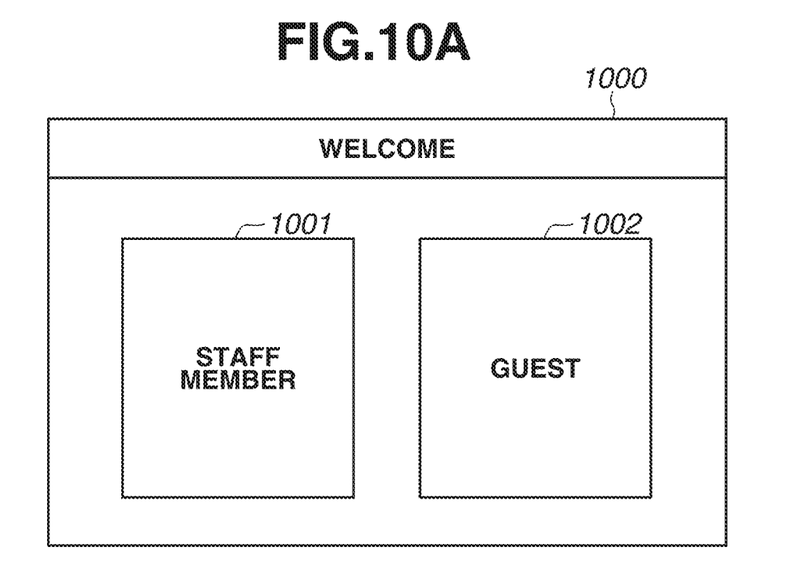
FIG. 10A is a diagram illustrating an example of a role selection screen.

When the MFP 100 is activated, first in step S901, the UI control module 340 instructed by the authentication control unit 321 displays the role selection screen for prompting the user to select whether to use the MFP 100 as an authenticated user or a guest user. FIG. 10A is a diagram illustrating an example of the role selection screen. In a role selection screen 1000 of FIG. 10A, a button 1001 is a button to be pressed if an authenticated user such as an administrator or an employee logs in. A message "staff member" is displayed on the button 1001. A button 1002 is a button to be pressed if a guest user logs in. A message "guest" is displayed on the button 1002.

Next, in step S902, the processing branches according to a result of user selection via the role selection screen 1000. If the user presses the button 1001 on the role selection screen 1000 (authenticated user; YES in step S902), the processing proceeds to step S903. If the user presses the button 1002 (guest user; NO in step S902), the processing proceeds to step S906.

Figure 10B:
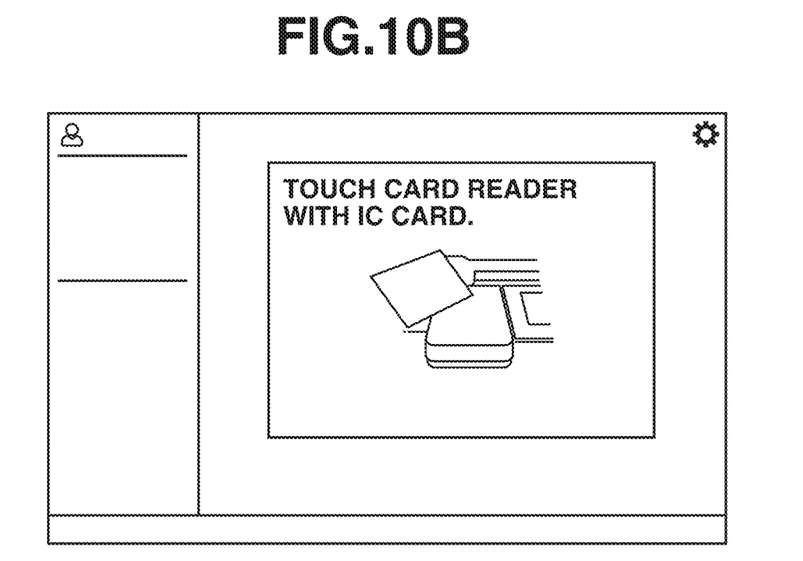
FIG. 10B is a diagram illustrating an example of an authentication screen.

In step S903, the authentication control unit 321 displays an authentication screen prompting the authenticated user to perform an authentication action (inputting an ID and a password, or holding an IC card over a card reader). FIG. 10B is a diagram illustrating an example of the authentication screen. FIG. 10B illustrates a screen (authentication screen 1010) for performing authentication using an IC card.

In step S904, the authentication control unit 321 determines whether the authentication processing is successful. More specifically, authentication control is performed according to the management of the user management unit 322 so that only users belonging to the "staff" domain can use the MFP 100. If the user holds an IC card over a card reader (not illustrated) according to the authentication screen 1010 and the authentication succeeds (YES in step S904), the processing proceeds to step S905. If the authentication fails (NO in step S904), the processing ends without login permission since the user is not confirmed to be an authorized user. In such a case, for example, a message indicating an authentication error or prompting the user to retry authentication can be displayed.

In step S905, the successfully-authenticated user is permitted to log in, and the foregoing function menu screen 600 for an authenticated user is displayed on the display unit 210. The authenticated user who has logged in selects and presses a button corresponding to a desired application (function) from the function menu screen 600, and uses the application (function).

In step S906, the user is permitted to log in as a guest user not required to be authenticated. The foregoing function menu screen 610 or 620 for a guest user is displayed on the display unit 210. The user permitted to log in as a guest selects and presses a button corresponding to a desired application (function) from the function menu screen 610 or 620, and uses the application (function). In particular, if the user selects the print function via the function menu screen 620, selection buttons are displayed in units of the guest PCs (in the present exemplary embodiment, two guest PCs including the guest PC1 and the guest PC2). The user can press a button corresponding to the PC that the user has used in inputting the print data.

Suppose, for example, that the function menu screen 620 is displayed as described above. For example, if the guest user uses the guest PC1 to input print data, the guest user presses the button 622 to display the foregoing print UI screen 800 of FIG. 8. The guest user selects the user's print data from the list of print data input from the guest PC1, and presses the print start button 802. If a predetermined fee is not yet paid, a message prompting payment is displayed on the display unit 210.

Details of the login processing of the MFP 100 according to the present exemplary embodiment have been described above.

According to the present exemplary embodiment, in situations in which guest users use a plurality of PCs to use hold printing, print data input from each PC can be displayed. The guest users can thus easily find out their own print data to avoid printing mistakes.

In the first exemplary embodiment, when the user to log in is a guest user and the function menu screen with limited functions available is displayed, a list of print data is displayed in units of PCs so that the guest user can identify the PC from which the print data is input. However, such a mode may not be necessary for a guest user who wants to use the copy function.

A second exemplary embodiment describes a mode in which the copy application is immediately activated without the display of the function menu screen if there is no print data input by a guest user at the time of login processing. A description of portions similar to those of the first exemplary embodiment will be omitted or simplified, and differences will be described below.

Figure 11:
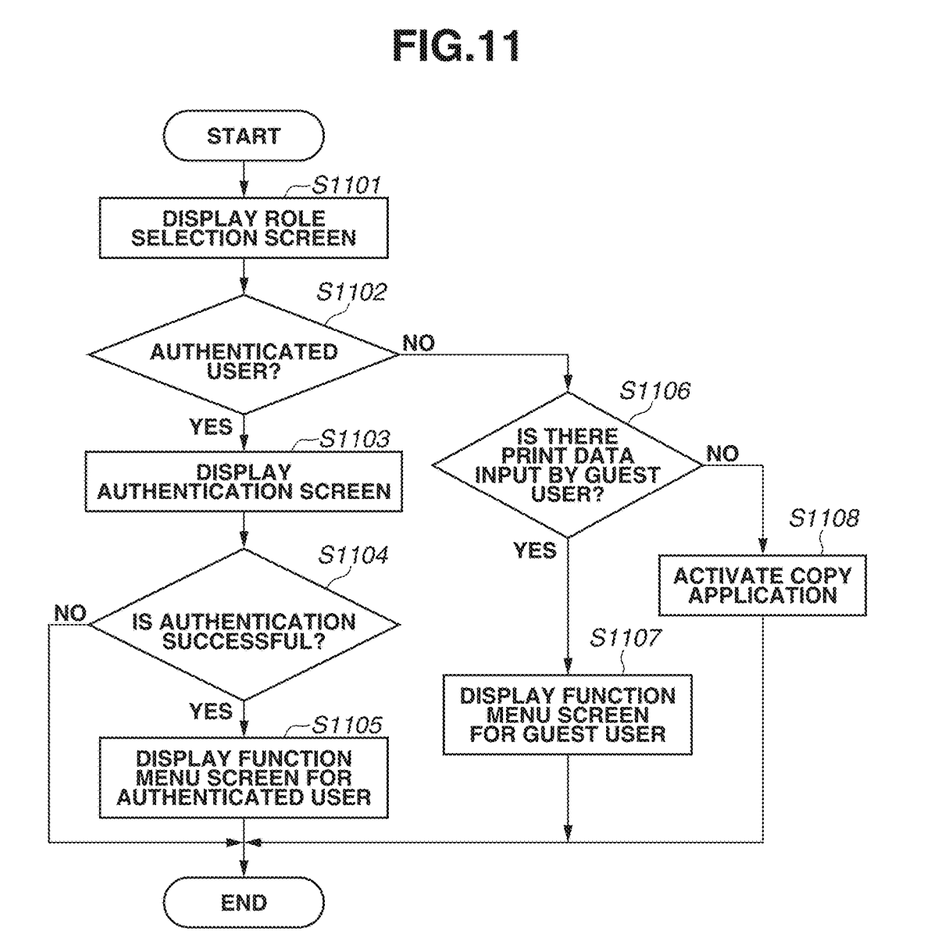
FIG. 11 is a flowchart illustrating a flow of login processing according to a second exemplary embodiment.

FIG. 11 is a flowchart illustrating a flow of the login processing according to the present exemplary embodiment. Steps S1101 to S1105 correspond to steps S901 to S905 of the flowchart of FIG. 9 according to the first exemplary embodiment. If the user to log in is a guest user and presses the button 1002 on the role selection screen 1000 (NO in step S1102), the processing proceeds to step S1106. In step S1106, the authentication control unit 321 determines whether there is print data (print job) input by a guest user. If there is print data input by a guest user (YES in step S1106), the processing proceeds to step S1107. In step S1107, similar to the first exemplary embodiment, the function menu screen for a guest user is displayed. If there is no print data input by a guest user (NO in step S1106), the processing proceeds to step S1108. In step S1108, the copy application 360 is immediately activated without displaying the function menu screen, and a UI screen (not illustrated) for the guest user to use the copy function is displayed on the display unit 210.

Details of the login processing according to the present exemplary embodiment have been described above. The guest user who wants to use the copy function from the beginning can thus quickly use the copy function.

According to an exemplary embodiment, in situations in which a plurality of PCs is used to use hold printing, print data input by each PC can be displayed. Even in situations in which guest users use hold printing from a plurality of PCs, a user can easily find out print data input by the user since a list of print data displayed includes only print data input from the PC used by the guest user. This results in the prevention of occurrence of printing mistakes.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-184464, filed Sep. 21, 2016, which is hereby incorporated by reference herein in its entirety.

What is claimed is:

1. A printing apparatus comprising:
a network interface for communicating with an information processing apparatus via a network;
one or more memories capable of storing print data received via the network;
a display configured to display an image;
a printer configured to print an image on a sheet;
one or more processors configured to execute a set of instructions to:
store print data via the network interface from a first information processing apparatus that is operable by a guest user who is not required to be personally authenticated for using the printing apparatus into the one or more memories in association with first identification information for identifying the first information processing apparatus;
store print data received via the network interface from a second information processing apparatus that is operable by the guest user into the one or more memories in association with second identification information for identifying the second information processing apparatus,
to display a first object and a second object on the display when logging into the printing apparatus as the guest user is permitted, the first object being an object for selecting display of a list of print data received from the first information processing apparatus, the second object being an object for selecting display of the list of the print data received from first second information processing apparatus
display, on the display, a list of the print data stored into the one or more memories in association with the first identification information in accordance with selection of the first object displayed, and
display, on the display, a list of the print data stored into the one or more memories in association with the second identification information in accordance with selection of the second object displayed.

2. The image forming apparatus according to claim 1, wherein the one or more processors execute the instruction to cause the printer to print the print data selected from the list of print data displayed on the display unit.

3. The printing apparatus according to claim 1,
wherein user identification information of a user who inputted the print data is attached to the print data received via the network interface,
wherein the one or more processors execute the instructions to
store the print data received via the network interface into the one or more memories in association with the user identification information attached to the print data, and
display, on the display, a list of the print data stored into the one or more memories in association with the user identification information of a login user when logging into the printing apparatus as an authentication user who is required to be personally authenticated for using the printing apparatus is permitted.

4. The printing apparatus according to claim 3, wherein the one or more processors execute the instructions to display, on the display, a selection screen for selecting whether to log into the printing apparatus as the authentication user or to log into the printing apparatus as the guest user.

5. The printing apparatus according to claim 4,
wherein the one or more processors execute the instructions to
display, on the display, an authentication screen for prompting the user to input authentication information in a case where logging into the printing apparatus as the authentication user is selected on the selection screen, and permit the user to log into the printing apparatus as the authentication user when authentication processing based on the authentication information inputted by the user is successful, and
permit the user to log into the printing apparatus as the guest user without displaying the authentication screen and without performing the authentication processing in a case where logging into the printing apparatus as the guest user is selected on the selection screen.

6. A control method of a printing apparatus capable of communicating with a plurality of information processing apparatuses via a network interface, the control method comprising:
storing print data received via the network interface from a first information processing apparatus that is operable by; that is operable by a guest user who is not required to be personally authenticated for using the printing apparatus in association with first identification information for identifying the first information processing apparatus; and
storing print data received via the network interface from a second information processing apparatus that is operable by the guest user in association with second identification information for identifying the second information processing apparatus;
displaying a first object and a second object when logging into the printing apparatus as the guest user is permitted, the first object being an object for selecting display of a list of print data received from the first information processing apparatus, the second object being an object for selecting display of a list of print data received from the second information processing apparatus;
displaying a list of the print data stored in association with the first identification information in accordance with selection of the first object displayed; and
displaying a list of the print data stored in association with the second identification information in accordance with selection of the second object displayed.

7. A non-transitory computer-readable storage medium storing a program for causing a computer to perform a control method of a printing apparatus capable of communicating with a plurality of information processing apparatuses, the control method comprising:
  storing print data received via the network interface from a first information processing apparatus that is operable by a guest user who is not required to be personally authenticated for using the printing apparatus in association with first identification information for identifying the first information apparatus; and
  storing print data received via the network interface from a second information processing apparatus that is operable by the guest user in association with second identification information for identifying the second information processing apparatus;
  displaying a first object and a second object when logging into the printing apparatus as the guest user is permitted, the first object being an object for selecting display the list of print data received from the first information processing apparatus, and the second object being an object for selecting display of a displaying the list of print data received from the second information processing apparatus;
  displaying a list of the print data stored in association with the first identification information in accordance with selection of the first object displayed; and
  displaying a list of the print data stored in association with the second identification information in accordance with selection of the second object displayed.

* * * * *